US008131007B2

(12) United States Patent
Tewfik et al.

(10) Patent No.: US 8,131,007 B2
(45) Date of Patent: Mar. 6, 2012

(54) WATERMARKING USING MULTIPLE WATERMARKS AND KEYS, INCLUDING KEYS DEPENDENT ON THE HOST SIGNAL

(75) Inventors: Ahmed Tewfik, Edina, MN (US); Bin Zhu, Beijing (CN); Mitch Swanson, Eden Prairie, MN (US)

(73) Assignee: Regents of the University of Minnesota, St. Paul, MN (US)

(*) Notice: Subject to any disclaimer, the term of this patent is extended or adjusted under 35 U.S.C. 154(b) by 1064 days.

(21) Appl. No.: 11/929,137

(22) Filed: Oct. 30, 2007

(65) Prior Publication Data

US 2008/0226121 A1     Sep. 18, 2008

Related U.S. Application Data

(63) Continuation-in-part of application No. 10/360,794, filed on Apr. 30, 2001, now Pat. No. 7,366,908, which is a continuation-in-part of application No. 08/921,931, filed on Aug. 27, 1997, now Pat. No. 6,226,387, said application No. 10/360,794 is a continuation-in-part of application No. 08/918,126, filed on Aug. 27, 1997, now Pat. No. 6,272,634, said application No. 10/360,794 is a continuation-in-part of application No. 08/918,125, filed on Aug. 27, 1997, now Pat. No. 6,282,299.

(60) Provisional application No. 60/050,587, filed on Jun. 24, 1997, provisional application No. 60/024,979, filed on Aug. 30, 1996.

(51) Int. Cl.
 *H04K 1/00* (2006.01)

(52) U.S. Cl. ........................................ 382/100; 713/176

(58) Field of Classification Search .................. 382/100, 382/232; 713/176; 380/252, 287, 54
See application file for complete search history.

(56) References Cited

U.S. PATENT DOCUMENTS

| | | | |
|---|---|---|---|
| 5,319,735 A | 6/1994 | Preuss et al. | 395/2.14 |
| 5,404,377 A | 4/1995 | Moses | 375/200 |
| 5,450,490 A | 9/1995 | Jensen et al. | 380/6 |
| 5,613,004 A | 3/1997 | Cooperman et al. | 380/28 |
| 5,905,800 A | 5/1999 | Moskowitz et al. | 380/28 |
| 6,185,683 B1 | 2/2001 | Ginter et al. | 713/176 |
| 6,233,684 B1 | 5/2001 | Stefik et al. | 713/176 |
| 6,272,634 B1 | 8/2001 | Tewfik et al. | 713/176 |
| 6,353,672 B1 | 3/2002 | Rhoads | 382/100 |
| 6,370,272 B1 | 4/2002 | Shimizu | 382/232 |
| 6,427,012 B1 | 7/2002 | Petrovic | 380/238 |

(Continued)

FOREIGN PATENT DOCUMENTS

| | | |
|---|---|---|
| DE | 3806414 A1 | 9/1989 |
| EP | 581317 A2 | 2/1994 |

OTHER PUBLICATIONS

Boney, L., et al., "Digital Watermarks for Audio Signals", Proceedings of the 1996 IEEE International Conference on Multimedia Computing Systems, Multimedia '96, Hiroshima, Japan, 473-480 (Jun. 1996).

(Continued)

*Primary Examiner* — Andrew W Johns

(57) ABSTRACT

A method of embedding a watermarking in a host signal computes a first watermark depending on a particular party and computes a second watermark depending on the host signal. The method embeds the first and second watermarks in the host signal. At least one of the watermarks is embedded using a key derived from the host signal. In particular, one of the watermarks is embedded with a key derived from the host signal.

16 Claims, 3 Drawing Sheets

U.S. PATENT DOCUMENTS

| | | | |
|---|---|---|---|
| 6,539,095 | B1 | 3/2003 | Rhoads ................. 381/73.1 |
| 6,542,620 | B1 | 4/2003 | Rhoads ................. 382/100 |
| 6,560,349 | B1 | 5/2003 | Rhoads ................. 382/100 |
| 6,654,480 | B2 | 11/2003 | Rhoads ................. 382/100 |
| 6,675,146 | B2 | 1/2004 | Rhoads ................. 704/270 |
| 6,718,047 | B2 | 4/2004 | Rhoads ................. 382/100 |
| 6,778,682 | B2 | 8/2004 | Rhoads ................. 382/100 |
| 7,062,069 | B2 | 6/2006 | Rhoads ................. 382/100 |
| 7,945,781 | B1 | 5/2011 | Rhoads ................. 713/176 |
| 2002/0064298 | A1 | 5/2002 | Rhoads et al. ........... 382/100 |

OTHER PUBLICATIONS

Tanaka, K., et al., "Embedding Secret Information into a Dithered Multi-Level Image", 1990 IEEE Military Communications Conference, vol. 1, "Milcom 90: A New Era," Monterey, CA, 216-220 (Sep. 30-Oct. 3, 1990).

van Schyndel, R.G., et al., "A Digital Watermark", Proceedings of the IEEE, ICIP-94, vol. II, Austin, TX, 86-90 (Nov. 13-16, 1994).

Matsui, K., et al., "Video-Steganography: How to Secretly Embed a Signature in a Picture", IMA Intellectual Property Project Proceedings, vol. 1, 187-206 (Jan. 1994).

Anderson, "Stretching the Limits of Steganography," Proc. First Int. Workshop on Information Hiding, pp. 39-48, May 30, 1996.

Zhao et al, "Embedding Robust Labels into Images for Copyright Protection," Proc. of the International Congress on Intellectual Property Rights for Specialized Information, Knowledge and New Technologies, 10 pages, Aug. 21, 1995.

Zhao, "A WWW Service to Embed and Prove Digital Copyright Watermarks," Proc. of the European Conference on Multimedia Applications, Services and Techniques, May 1996, 15 pages.

WATERMARKING USING MULTIPLE WATERMARKS AND KEYS, INCLUDING KEYS DEPENDENT ON THE HOST SIGNAL

RELATED APPLICATION DATA

This application is a continuation in part of U.S. patent application Ser. No. 10/360,794, filed Apr. 30, 2001, which is a continuation-in-part of application Ser. No. 08/921,931, filed Aug. 27, 1997 (now U.S. Pat. No. 6,226,387), which claims priority to provisional applications 60/050,587, filed Jun. 24, 1997, and 60/024,979, filed Aug. 30, 1996.

U.S. patent application Ser. No. 10/360,794 is also a continuation-in-part of application Ser. No. 08/918,126, filed Aug. 27, 1997 (now U.S. Pat. No. 6,272,634), which claims priority to provisional applications 60/050,587, filed Jun. 24, 1997, and 60/024,979, filed Aug. 30, 1996.

U.S. patent application Ser. No. 10/360,794 is also a continuation-in-part of application Ser. No. 08/918,125, filed Aug. 27, 1997 (now U.S. Pat. No. 6,282,299), which claims priority to provisional applications 60/050,587, filed Jun. 24, 1997, and 60/024,979, filed Aug. 30, 1996.

The above applications and patents are incorporated by reference.

GOVERNMENT RIGHTS STATEMENT

The inventions detailed in this application was made with government support by AFOSR under grant AF/F49620-94-1-0461, and ARPA GRANT No. USDOC6NANB2D1272. The Government has certain rights in this invention.

FIELD OF THE INVENTION

This invention relates generally to techniques for embedding data such as watermarks, signatures and captions in digital data, and more particularly to digital watermarking to resolve multiple claims of ownership.

BACKGROUND OF THE INVENTION

The world wide web, Internet, and many other distributed networks continue to provide opportunities for new and improved digital information dissemination. Digital audio, video, and images may be easily distributed, reproduced, and manipulated. However, these efficiencies also increase the problems associated with copyright enforcement. For this reason, creators and distributors of digital data are hesitant to provide access to their intellectual property. Reliable solutions to the problems associated with copyright protection of multimedia data are actively being pursued.

Digital watermarking has been proposed as a means to identify the owner or distributor of digital data. Watermarking is the process of encoding hidden copyright information in digital data by making small modifications to the data samples. Unlike encryption, watermarking does not restrict access to the data. Once encrypted data is decrypted, the media is no longer protected. A watermark is designed to permanently reside in the host data. When the ownership of a digital work is in question, the information can be extracted to characterize the owner.

A digital watermark is designed to be perceptually and statistically invisible with the host media (e.g., image, audio, or video). This ensures that the watermark does not degrade the host media. It also helps to prevent illegal removal of the copyright protection by a "pirate." The watermark is also designed to be robust to signal distortions, incidental and intentional, applied to the host data. Possible distortions include normal signal processing operations, e.g., coding, filtering, scaling, etc., and deliberate attempts to forge, remove, or invalidate the watermark. Generally, a resourceful pirate may use a variety of signal processing operations to attack a digital watermarking. A pirate may attempt to defeat a watermarking procedure in three ways: (1) damage the host media to make the watermark undetectable, (2) establish that the watermarking scheme is unreliable, i.e., it detects a watermark when none is present.

Finally, (3) the extracted watermark must also correctly identify the owner and solve the deadlock issue when multiple parties claim ownership of a digital work. A deadlock may occur when a second party watermarks another person's data, thereby asserting unlawful ownership of another's intellectual property. That is, the main function of a watermarking algorithm is to unambiguously establish and protect ownership of data. However, many current watermarking schemes are unable to resolve rightful ownership of digital data when multiple ownership claims are made, i.e., when a deadlock problem arises. The inability to deal with deadlock is independent of how the watermark is inserted in the digital data or how robust it is to various types of modifications.

Watermarking techniques which do not require the original (non-watermarked) signal are the most vulnerable to ownership deadlocks. A pirate simply adds his or her watermark to the watermarked data. The data now has two watermarks. Prior art watermarking schemes are typically unable to establish who watermarked the data first.

Watermarking procedures that require the original data set for watermark detection also suffer from deadlocks. In such schemes, a party other than the owner may counterfeit a watermark by "subtracting off" a second watermark from the publicly available data and claim the result to be his or her original. This second watermark allows the pirate to claim copyright ownership since he or she can show that both the publicly available data and the original of the rightful owner contain a copy of their counterfeit watermark.

It would seem that the original (non-watermarked) media should be able to resolve the deadlock issue. Party A should have an original $S_{orig}$ which does not contain Party B's watermark. On the other hand, Party B's "original" must have Party A's watermark, since it is derived from the data Party A watermarked and distributed. However, current watermarking techniques are susceptible to an intelligent attack by Party B which destroys this logic. In particular, Party B can create a watermark $W^B$ which shows up in Party A's original $S_{orig}$. Both originals, one from each party, contains the others watermark. Thus, a deadlock is created.

Party B's watermark is created by "subtracting off" a second watermark from the publicly available data. The difference is declared Party B's "original." For example, suppose Party A watermarks data $S_{orig}^A$ using their watermark $W^A$, and allows the watermarked data $$S_{water}^A = S_{orig}^A + W^A$$

to be accessible to the public, Party B takes the watermarked data $S_{water}$ and creates their own "original" data $S_{water}^B$ by subtracting off a second watermark $W^B$:

$$S_{orig}^B = S_{water}^A - W^B.$$

Thus, both watermarks $W^A$ and $W^B$ exist in the publicly available data $S_{water}^A$:

$$S_{water}^A = S_{orig}^A + W^A = S_{orig}^B + W^B.$$

When $S_{water}^A$ is tested for $W^A$ and $W^B$, both will be positively identified. The originals from each party may be consulted. Party A can find their watermark $W^A$ in Party B's original as $$S_{orig}^B - S_{orig}^A = (S_{water}^A - W^B) - S_{orig}^A = (S_{orig}^A + W^A) - W^B - S_{orig}^A = W^A - W^B.$$

However, Party B can find their watermark $W^B$ in Party A's original, as $$S_{orig}^A - S_{orig}^B = S_{orig}^A - (S_{water}^A - W^B) = S_{orig}^A - (S_{orig}^A + W^A) + W^B = W^B - W^A.$$

As a result, this second watermark allows the pirate to claim copyright ownership since he or she can show that both the publicly available data and the original of the rightful owner contain a copy of their counterfeit watermark. Thus, there is a need for watermarking procedures applicable to digital data that do not suffer from the described shortcomings, disadvantages and problems.

SUMMARY OF THE INVENTION

One aspect of the invention is a method of embedding a watermarking in a host signal. This method computes a first watermark depending on a particular party and computes a second watermark depending on the host signal. The method embeds the first and second watermarks in the host signal.

At least one of the watermarks is embedded using a key derived from the host signal. In particular, one of the watermarks is embedded with a key derived from the host signal.

Another aspect of the invention is a method of digital watermarking a media signal comprising deriving a first key that is a function of the media signal; generating a digital watermark signal that is a function of the first key and a second key that is not dependent on the media signal; and embedding the digital watermark in the media signal.

Another aspect of the invention is a method of detecting a digital watermark in a host signal comprising obtaining a first key that is a function of the host signal; generating a representation of a digital watermark from the first key and a second key that is not dependent on the host signal; and processing the host signal with the representation of the digital watermark to extract the digital watermark from the host signal.

In one embodiment of the invention, an author representation is based on the host digital data signal. An author is represented with a pseudo-random sequence (i.e., the watermark) created by a pseudo-random generator and two keys. One key is author dependent, while the second key is signal dependent. The representation is able to resolve rightful ownership in the face of multiple ownership claims.

In another embodiment of the invention, a watermarker uses two or more watermarks. A watermarking scheme uses the original signal to detect the presence of a watermark. This watermark is integrated with a second watermark that does not require the original signal. These embodiments of the invention solve the deadlock problem described in the background section of the application.

Further aspects, advantages and embodiments of the invention will become apparent by reference to the drawings, and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Overview of the Watermarking and Watermark Detecting Processes

Figure 1A:
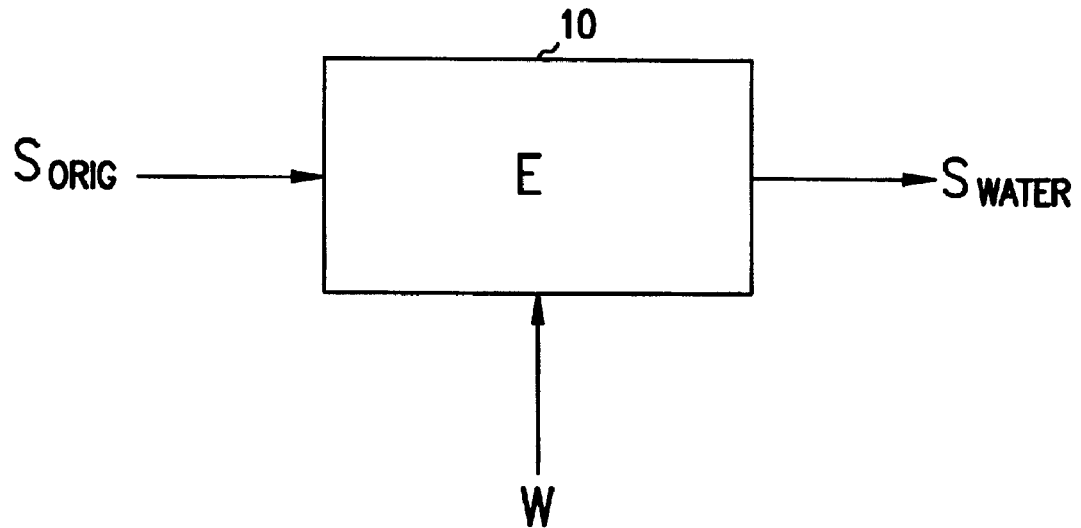
FIG. 1(a) is a diagram of a system to embed a watermark in digital host data, according to an embodiment.

A watermarking system for digital media consists of two parts: (1) embedding the watermark in digital host data, and (2) detecting the watermark within the digital host data to identify the owner. The first part is described in reference to FIG. 1(a), whereas the second part is described in reference to FIG. 1(b). A diagram of a system to embed a watermark in digital host data is shown in FIG. 1(a). The multimedia digital host data to be watermarked may be an image, an audio clip, or a video sequence. $S_{orig}$ denotes the original multimedia signal without any watermark. Furthermore, W denotes the watermark which the owner wishes to embed and $S_{water}$ denotes the signal with the embedded watermark. Watermarker 10 embeds the watermark into the original signal to produce the watermarked signal. Watermarker 10 may be a computerized system, having hardware and/or software components; the invention is not so particularly limited. The watermark W is embedded into $S_{orig}$ by an embedding function performed by watermarker 10 and generally written as $$E(S_{orig}, W) = S_{water}.$$

The embedding function E makes small modifications to $S_{orig}$ according to W. For example, if $W=(W_1, W_2, \ldots)=(1, 0,1,1,0, \ldots)$, the embedding function may add or subtract a small amount $\alpha$ from each pixel or sample of $S_{orig}$ according to whether $W_1=1$ or 0.

Figure 1B:
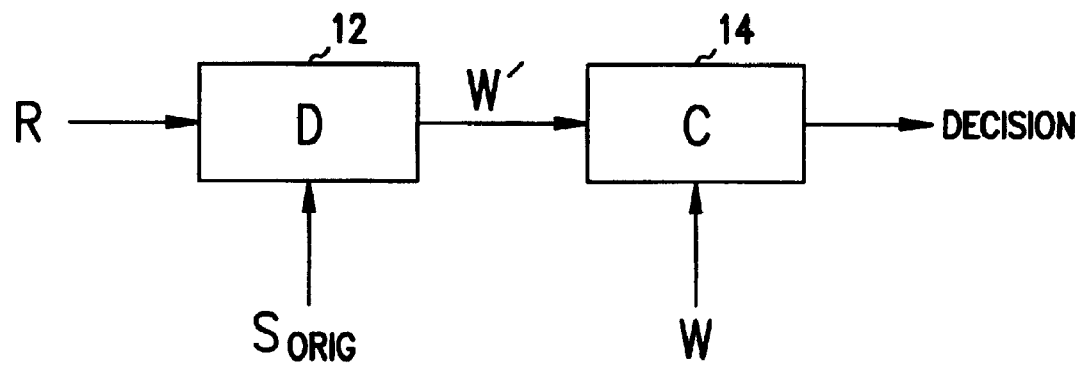
FIG. 1(b) is a diagram of a system of a system to detect and compare a watermark embedded in digital host data, according to an embodiment.

Referring next to FIG. 1(b), a diagram of a system to detect and compare a watermark embedded in digital host data is shown. Detector 12 extracts a sequence W' from a received signal R being tested, using knowledge of W and possibly $S_{orig}$. Detector 12 may be a computerized system, having hardware and/or software components; the invention is not so particularly limited. The sequence W' is extracted by a detecting function performed by detector 12 and generally written as $$D(R, S_{orig}) = W'.$$

The test signal R may or may not be the watermarked (and possibly distorted) signal $S_{water}$. Comparator 14 compares the extracted sequence W' with the original watermark W to determine whether the recovered signal is watermarked.

Comparator 14 may be a computerized system, having hardware and/or software components; the invention is not so particularly limited. The comparison performed by comparator 14 is in one embodiment a correlation measure C and a binary decision is made:

$$c(W', W) = \begin{cases} 1, & c \geq \alpha \\ 0, & \text{otherwise} \end{cases}$$

where c is the value of the correlation and $\alpha$ is a threshold. A '1' indicates a watermark was detected, while a '0' indicates that no watermark was detected. In other words, if W and W' are sufficiently correlated (greater than some threshold), the signal is declared watermarked and the author has ownership rights to the media. Otherwise the media R is deemed free from copyright protection.

The invention is not particularly limited to any three-tuple (E, D, C) computerized system for embedding, detecting, and comparing purposes. That is, any watermark technique, characterized in terms of the three-tuple (E, D, C) as described above may be amenable to the invention as otherwise described in this application. Specifically, inasmuch as any watermark technique is amenable to resolve the deadlock issue as has been described (i.e., resolve multiple claims of ownership), the technique may be used to make an embodiment.

Several watermarking techniques in general are known within the art. Many such techniques are based on adding fixed amplitude pseudo-noise (PN) sequences to an image. In this case, E and D are simply the addition and subtraction operators, respectively. PN sequences are also used as the "spreading key" when considering the host media as the noise in a spread spectrum system, where the watermark is the transmitted message. In this case, the PN sequence is used to spread the data bits over the spectrum to hide the data. When applied in the spatial or temporal domains, these approaches modify the least significant bits (LSB) of the host data. Invisibility of the watermark is based on the assumption that the LSB data are insignificant. The watermark is generally recovered using knowledge of the PN sequence (and perhaps other secret keys, like watermark location) and the statistical properties of the embedding process.

Several spatial techniques for watermarking also exist in the art. For example, a statistical technique may be used which randomly chooses n pairs $(a_i, b_i)$ of points in an image and increases the brightness of by one unit $a_i$ while simultaneously decreasing the brightness of $b_i$. Another such technique hides data by mapping a random texture pattern in an image to another region in the image with a similar texture pattern. This method is limited to images that possess large areas of random texture.

In other copyright protection schemes, the watermarks are made to appear as quantization noise when embedded into the images. A predictive coding scheme may be used to embed the watermark into the image. Or, the watermark may be embedded into the image by dithering the image based on the statistical properties of the image. In another scheme, a watermark for an image is generated by modifying the luminance values inside 8×8 blocks of pixels, adding one extra bit of information to each block. The choice of the modified block is secretly made by the encoder.

Furthermore, the Xerox Data-Glyph technology, known within the art, adds a bar code to its images according to a predetermined set of geometric modifications. In another scheme, data is hidden in the chrominance signal of NTSC by exploiting the temporal over-sampling of color. Still another watermarking scheme provides for constructing a watermark by concealing graph data in the LSB's of the image.

Transform based watermarking techniques have also been proposed in the art. To embed a watermark, a transformation is applied to the host data, and modifications are made to the transform coefficients. Possible image transformations include the FFT, discrete cosine transform (DCT), wavelet, subband, Hadamard, and others. A JPEG model based, frequency hopped, randomly sequenced pulse position modulated code is posited in accordance with one particular approach. The approach modifies the difference between randomly selected mid frequency components in random image blocks. Setting linear or circulant constraints on the middle frequency DCT coefficients of random image blocks is done in one specific scheme. In another scheme, the middle band DCT coefficients of image blocks are modified to hold signature data.

Another watermarking scheme proffers a codeword that is generated and used to modulate selected coefficients of the DCT or wavelet transform of a block in an image. In a different scheme, the scheme causes perturbance of the phase of FFT coefficients of 8×8 image blocks to embed a watermark. The largest DCT components of an image are modified by Gaussian noise in one particular watermarking scheme. Another scheme embeds digital data into analog TV signals. The method substitutes high-spatial frequency image data for "hidden" data in a pyramid-encoded image. A phase coding approach is used in a different scheme to embed a watermark in audio signals. The data is embedded by modifying the phase values of Fourier Transform coefficients of audio segments. Another audio watermarking technique is proposed replaces Fourier Transform coefficients over the middle frequency bands with the signature spectral components. A method to watermark compressed video by modifying the MPEG bitstream is also in a scheme within the art.

All such watermarking, detecting and comparing schemes may be amenable to the resolution of deadlock. Furthermore, in particular, sound, image, and video watermarking embodiments described in the priority and incorporated patents and applications are specifically amenable to the invention. These embodiments ensure robust and imperceptible watermarks.

Hardware Implementation of the Invention

Figure 2:
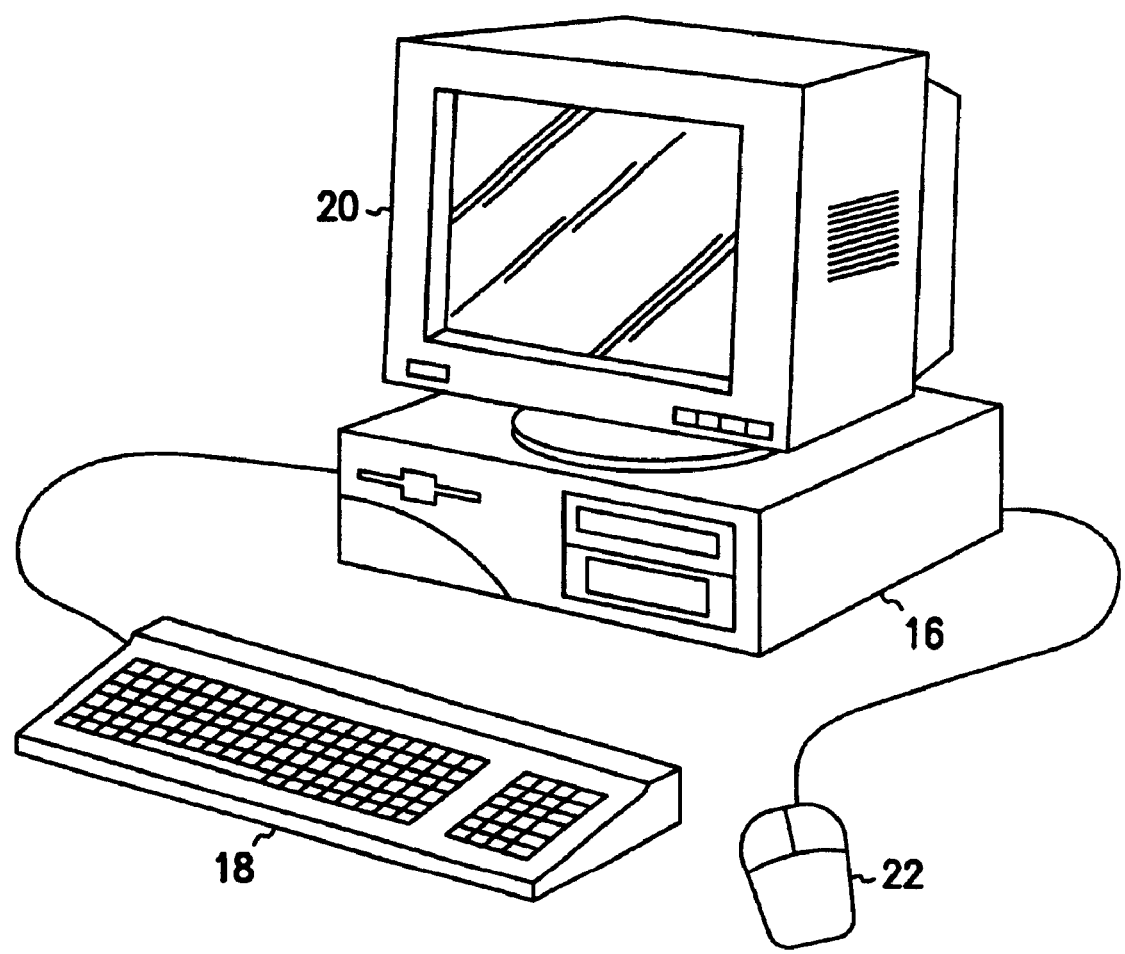
FIG. 2 is a diagram of a typical computer to be used with embodiments of the invention.

The invention is not limited as to the type of computer on which it runs. However, a typical example of such a computer is shown in FIG. 2. Computer 16 is a desktop computer, and may be of any type, including a PC-compatible computer, an Apple Macintosh computer, a UNIX-compatible computer, etc. Computer 16 usually includes keyboard 18, display device 20 and pointing device 22. Display device 20 can be any of a number of different devices, including a cathode-ray tube (CRT), etc. Pointing device 22 as shown in FIG. 2 is a mouse, but the invention is not so limited. Not shown is that computer 16 typically also comprises a random-access memory (RAM), a read-only memory (ROM), a central-processing unit (CPU), a fixed storage device such as a hard disk drive, and a removable storage device such as a floppy disk drive. The computer program to implement the invention is typically written in a language such as C, although the invention is not so limited.

The specifics of the hardware implementation have been described. A particular implementation is now described.

Implementation of the Invention Resolving the Deadlock Issue

Figure 3:
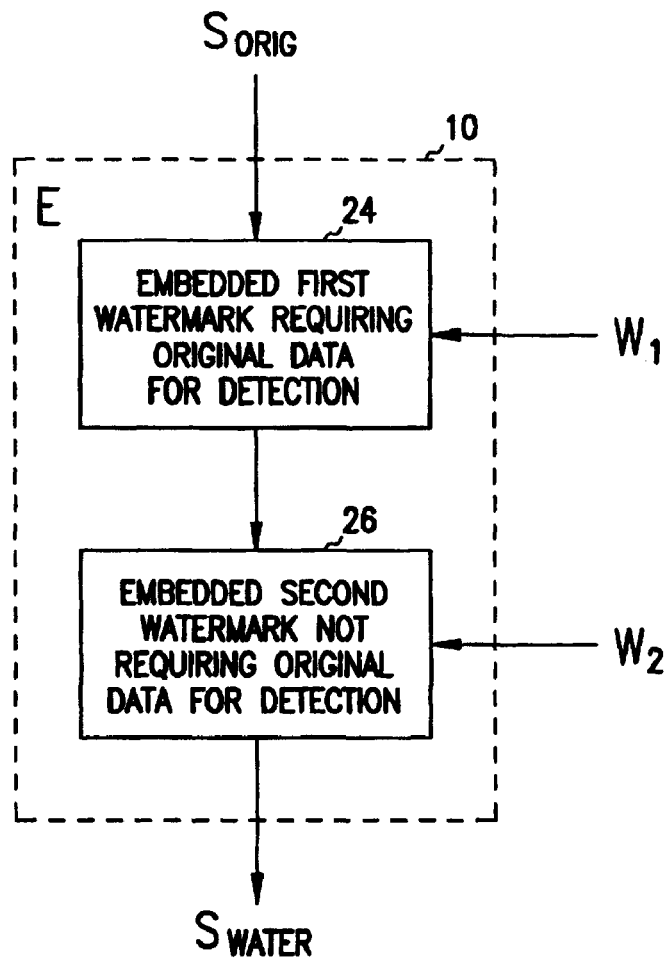
FIG. 3 is a diagram of a watermarker to resolve the deadlock issue according to one embodiment; and, FIG. 4 is a diagram of a watermark generator to generate watermarks so as to resolve the deadlock issue according to one embodiment.

Referring to FIG. 3, a diagram of a watermarker, which may be used as watermarker 10, to resolve the deadlock issue according to one embodiment of the invention is shown. For example, two parties may claim ownership of an audio clip. To determine the rightful owner of the audio clip, an arbitrator examines only the audio clip in question, the originals of both parties and the key used by each party to generate their watermark.

The dual watermark approach of FIG. 3 employs a pair of watermarks, one embedded by sub-watermarker 24, and another embedded by sub-watermarker 26. Each of sub-watermarker 24 and sub-watermarker 26 may be a computerized system, having hardware and/or software components; the invention is not so particularly limited. The watermarking procedure followed by sub-watermarker 24 requires the original data set for watermark detection. Sub-watermarker 24 embeds watermark W1 within $S_{orig}$ in accordance with an amenable watermarking scheme, as have been described, to which the invention is not particularly limited.

The second watermarking procedure followed by sub-watermarker 26 does not require the original data set and hence, is a more simple data hiding procedure. Sub-watermarker 26 embeds watermark W2 within $S_{orig}$ in which W1 has already been embedded. Any number of procedures can be used to insert the second watermark, as have been described, and the invention is not particularly limited. The output of sub-watermarker 26 is $S_{water}$, which is the original signal including both embedded watermarks.

The second watermark need not be highly robust to editing of the data segment since it is meant to protect the data that a pirate claims to be his original. The robustness level of many watermarking techniques that do not require the original for watermark detection is quite adequate. The arbitrator would expect the original to be of a high enough quality. This limits the operations that a pirate can apply to a host data and still claim it to be his high quality original data. The watermark that requires the original audio sequence for its detection is very robust.

In case of deadlock, the arbitrator first checks for the watermark that requires the original for watermark detection. If the pirate is clever and has used the attack suggested in and outlined above, the arbitrator would be unable to resolve the deadlock with this first test. The arbitrator then checks for the watermark that does not require the original audio sequence in the audio segments that each ownership contender claims to be his original. Since the original audio sequence of a pirate is derived from the watermarked copy produced by the rightful owner, it will contain the watermark of the rightful owner. On the other hand, the true original of the rightful owner will not contain the watermark of the pirate since the pirate has no access to that original and the watermark does not require subtraction of another data set for its detection.

Figure 4:
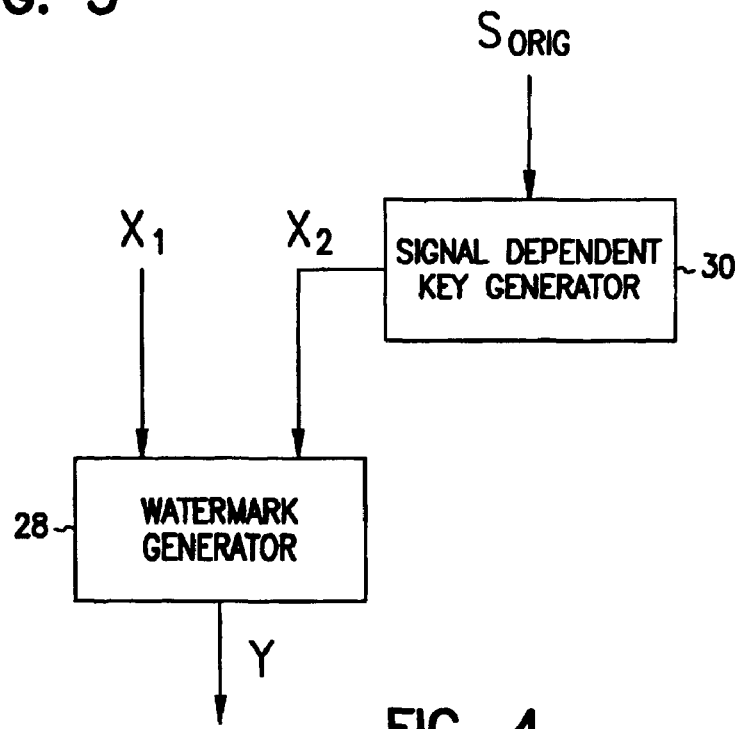

Besides dual watermarking, there is another approach to resolve deadlock: a dependent watermarking scheme. Referring now to FIG. 4, a diagram of a watermark generator, to generate such watermarks as W1 (and, alternatively, also W2), so as to resolve the deadlock issue according to one embodiment, is shown. That is, further protection against deadlock is provided by the technique used to select the pseudo-random sequence that represents the author (i.e., the sequence being the watermark).

Specifically, the author has two random keys $x_1$ and $x_2$ (i.e., seeds) from which a pseudo-random sequence y can be generated using watermark generator 28, which in one embodiment is a suitable pseudo-random sequence generator. Watermark generator 28 may be a computerized system, having hardware and/or software components; the invention is not so particularly limited. Popular generators include RSA, Rabin, Blum/Micali, and Blum/Blum/Shub, all of which are known within the art. With the two proper keys, the watermark may be extracted. Without the two keys, the data hidden in the audio is statistically invisible and impossible to recover. Note that this embodiment does not use the classical maximal length pseudo noise sequence (i.e., m-sequence) generated by linear feedback shift registers to generate a watermark. Sequences generated by shift registers are cryptographically insecure: one can solve for the feedback pattern (i.e., the keys) given a small number of output bits y.

The noise-like sequence y, after some processing, is the actual watermark hidden into the data stream. The key $x_1$ is author dependent, and is thus shown in FIG. 4 as directly being input into generator 28 without being output by a specific generator itself. Conversely, the key $x_2$ is signal dependent. The key $x_2$ is generated by signal-dependent key generator 30, which has as an input the original signal $S_{orig}$. Generator 30 may be a computerized system, having hardware and/or software components; the invention is not so particularly limited. Thus, watermark generator 28 generates a watermark y, which may be used as watermark $W_1$ or $W_2$, in the context of the watermarker of FIG. 3, based on the input of $x_1$ and the output $x_2$ of generator 30.

The key $x_1$ is assigned to (or chosen by) the author (that is, related to the author). Key $x_2$ is computed from the signal which the author wishes to watermark. It is computed from the host signal using a one-way hash function, by generator 28. In one embodiment, the tolerable error levels supplied by the masking models described in Swanson, Zhu, and Tewfik, "Transparent Robust Image Watermarking," in Proceedings 1996 International Conference on Image Conferencing, Volume III (Lausanne, Switzerland), pp. 211-214, 1996; Boney, Tewfik, and Hamdy, "Digital Watermarks for Audio Signals," in Proceedings 1996 IEEE International Conference on Multimedia Comp. and Systems (Hiroshima, Japan), pp. 473-480, 1996; and, Swanson, Zhu, and Twefik, "Object-based Transparent Video Watermarking," in Proceedings 1997 IEEE Multimedia Signal Processing Workshop Princeton, N.J.), pp. 369-374, 1997; all three references which are hereby incorporated by reference, are hashed to a key $x_2$. Furthermore, any one of a number of secure one-way hash functions known in the art may be used to compute $x_2$, including those known as RSA, MD4, and SHA. For example, the Blum/Blum/Shub pseudo-random generator uses the one way function $y=g_n(x)=x^2$ mod, n, where n=pq for primes p and q so that p=3 mod 4. It is known that generating x or y from partial knowledge of y is computationally infeasible for the Blum/Blum/Shub generator.

The signal dependent key $x_2$ generated by generator 30 makes counterfeiting very difficult. The pirate can only provide key $x_1$ to the arbitrator. Key $x_2$ is computed by the watermarking algorithm from the original signal. The pirate generates a counterfeit original by subtracting off a watermark. However, the watermark (partially generated from the signal dependent key) depends on the counterfeit original. Thus, the pirate must generate a watermark which creates a counterfeit original which, in turn, generates the watermark. As it is computationally infeasible to invert the one-way hash function, the pirate is unable to fabricate a counterfeit original which generates the desired watermark. Thus, the dual-watermarking and the host signal-dependent key embodiments solve the deadlock problem.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A method of embedding a watermarking in a host signal, the method comprising:
   computing a first watermark depending on a particular party;

computing a second watermark depending on the host signal; and embedding the first and second watermarks in the host signal; wherein the second watermark is embedded using a key derived from the host signal, and wherein the key is derived from the host signal by inputting a perceptual hash of the host signal into a key generator to generate the key.

2. A method of embedding a watermarking in a host signal, the method comprising:

computing a first watermark depending on a particular party;

computing a second watermark depending on the host signal; and embedding the first and second watermarks in the host signal; wherein the second watermark is computed based on a hash of the host signal.

3. The method of claim 2 wherein the hash comprises a hash of an output of a masking model applied to the host signal.

4. A method of embedding a watermarking in a host signal, the method comprising:

computing a first watermark depending on a particular party;

computing a second watermark depending on the host signal; and embedding the first and second watermarks in the host signal; wherein the second watermark is embedded using a key derived from the host signal, and wherein the key is derived using a masking model applied to the host signal.

5. A method of embedding a watermarking in a host signal, the method comprising:

computing a first watermark depending on a particular party;

computing a second watermark depending on the host signal; and embedding the first and second watermarks in the host signal; wherein the first watermark identifies a distributor of the host signal and is dependent on a key assigned to the distributor.

6. A method of embedding a watermarking in a host signal, the method comprising:

computing a first watermark depending on a particular party;

computing a second watermark depending on the host signal; and embedding the first and second watermarks in the host signal; wherein the first and second watermarks are both dependent on plural keys, wherein at least one of the plural keys for each of the first and second watermarks is derived from a function of the host signal.

7. The method of claim 6 wherein the function of the host signal comprises a hash of the host signal.

8. The method of claim 7 wherein the hash comprises a hash of output of a mask applied to the host signal.

9. A non-transitory computer readable medium on which is stored instructions, which when executed by a computer, perform a method of embedding a watermarking in a host signal, the method comprising:

computing a first watermark depending on a particular party;

computing a second watermark depending on the host signal; and embedding the first and second watermarks in the host signal; wherein the second watermark is embedded using a key derived from the host signal wherein the key is derived from the host signal by inputting a perceptual hash of the host signal into a key generator to generate the key.

10. A non-transitory computer readable medium on which is stored instructions, which when executed by a computer, perform a method of embedding a watermarking in a host signal, the method comprising:

computing a first watermark depending on a particular party;

computing a second watermark depending on the host signal; and embedding the first and second watermarks in the host signal; wherein the second watermark is computed based on a hash of the host signal.

11. The computer readable medium of claim 10 wherein the hash comprises a hash of an output of a masking model applied to the host signal.

12. A non-transitory computer readable medium on which is stored instructions, which when executed by a computer, perform a method of embedding a watermarking in a host signal, the method comprising:

computing a first watermark depending on a particular party;

computing a second watermark depending on the host signal; and embedding the first and second watermarks in the host signal; wherein the second watermark is embedded using a key derived from the host signal wherein the key is derived using a masking model applied to the host signal.

13. A non-transitory computer readable medium on which is stored instructions, which when executed by a computer, perform a method of embedding a watermarking in a host signal, the method comprising:

computing a first watermark depending on a particular party;

computing a second watermark depending on the host signal; and embedding the first and second watermarks in the host signal; wherein the first watermark identifies a distributor of the host signal and is dependent on a key assigned to the distributor.

14. A non-transitory computer readable medium on which is stored instructions, which when executed by a computer, perform a method of embedding a watermarking in a host signal, the method comprising:

computing a first watermark depending on a particular party;

computing a second watermark depending on the host signal; and embedding the first and second watermarks in the host signal; wherein the first and second watermarks are both dependent on plural keys, wherein at least one of the plural keys for each of the first and second watermarks is derived from a function of the host signal.

15. The computer readable medium of claim 14 wherein the function of the host signal comprises a hash of the host signal.

16. The computer readable medium of claim 15 wherein the hash comprises a hash of output of a mask applied to the host signal.

\* \* \* \* \*